(12) United States Patent
Melcher et al.

(10) Patent No.: US 12,272,464 B2
(45) Date of Patent: Apr. 8, 2025

(54) LOWER END REPLACEMENT OF A SLEEVE THAT LINES A CRDM NOZZLE IN A NUCLEAR REACTOR

(71) Applicant: Framatome Inc., Lynchburg, VA (US)

(72) Inventors: Ryan Melcher, Lynchburg, VA (US); Joseph Gallagher Baier, Lynchburg, VA (US); James Andrew Spencer, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 403 days.

(21) Appl. No.: 17/628,501

(22) PCT Filed: Jul. 22, 2019

(86) PCT No.: PCT/US2019/042805
§ 371 (c)(1),
(2) Date: Jan. 19, 2022

(87) PCT Pub. No.: WO2021/015732
PCT Pub. Date: Jan. 28, 2021

(65) Prior Publication Data
US 2022/0254529 A1 Aug. 11, 2022

(51) Int. Cl.
*G21C 13/036* (2006.01)
*G21C 17/017* (2006.01)
(Continued)

(52) U.S. Cl.
CPC ......... *G21C 13/036* (2013.01); *G21C 17/017* (2013.01); *G21C 19/207* (2013.01); *G21C 7/12* (2013.01); *G21C 13/032* (2013.01)

(58) Field of Classification Search
CPC .. G21C 13/036; G21C 19/207; G21C 17/017; G21C 13/032; G21C 7/12
(Continued)

(56) References Cited

U.S. PATENT DOCUMENTS

| | | | |
|---|---|---|---|
| 4,284,475 A | 8/1981 | Anthony | |
| 5,263,060 A * | 11/1993 | Obermeyer | G21C 17/10 |
| | | | 376/245 |

(Continued)

FOREIGN PATENT DOCUMENTS

FR 2689297 A1 10/1993

OTHER PUBLICATIONS

Search Report for International Application No. PCT/US2019/042805 mailed Feb. 12, 2020.

*Primary Examiner* — Jack W Keith
*Assistant Examiner* — Daniel Wasil
(74) *Attorney, Agent, or Firm* — Davidson Kappel LLC

(57) ABSTRACT

A method for replacing a damaged sleeve lining a tube passing through a nuclear reactor pressure vessel. The damaged sleeve has an end including a radially enlarged end portion for resting on a support section of the tube for retaining the damaged sleeve in the tube. The method includes removing the damaged sleeve from a tube; providing a sleeve assembly including a first sleeve with a radially variable end and a retainer; installing the sleeve assembly in the tube so the radially variable end of the first sleeve is received by the support section, the radially variable end being in a radially contracted configuration during installation and being in a radially expanded configuration after the sleeve assembly is installed in the tube; and deforming the retainer from an installation configuration to a retention configuration to retain the radially variable end of the first sleeve in the radially expanded configuration.

19 Claims, 9 Drawing Sheets

(51) Int. Cl.
*G21C 19/20* (2006.01)
*G21C 7/12* (2006.01)
*G21C 13/032* (2006.01)

(58) Field of Classification Search
USPC .......................................................... 376/353
See application file for complete search history.

(56) References Cited

U.S. PATENT DOCUMENTS

| | | | |
|---|---|---|---|
| 6,345,084 B1 | 5/2002 | Jensen | |
| 11,501,887 B2 * | 11/2022 | Benacquista | ........ G21C 13/036 |
| 11,721,445 B2 * | 8/2023 | Benacquista | ........ G21C 13/036 |
| | | | 376/353 |
| 2019/0252082 A1 | 8/2019 | Benacquista et al. | |

* cited by examiner

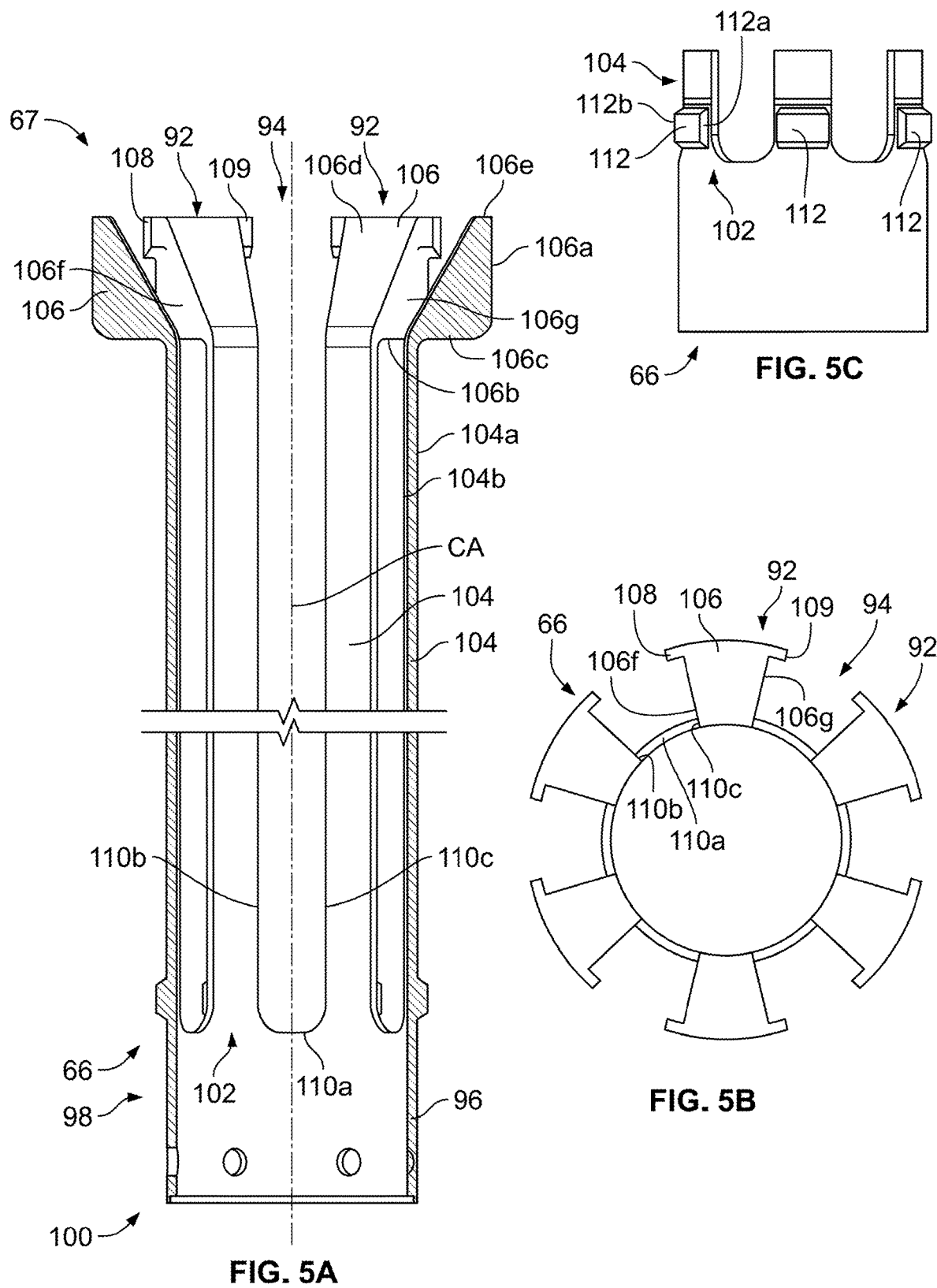

LOWER END REPLACEMENT OF A SLEEVE THAT LINES A CRDM NOZZLE IN A NUCLEAR REACTOR

CROSS-REFERENCE TO RELATED APPLICATIONS

This is a National Stage application of PCT international application PCT/US2019/042805, filed on Jul. 22, 2019, which are incorporated herein by reference in their entirety.

The present disclosure generally involves a method and device for replacing a sleeve lining a tube passing through a nuclear reactor pressure vessel and more specifically to a method and device for replacing a thermal sleeve lining a control rod drive mechanism (CRDM) nozzle or housing.

BACKGROUND

Reactor vessel closure heads (RVCH), for example in Westinghouse reactors, have thermal sleeves, whose main function is to shield the CRDM nozzle form thermal shock when the hot control rod drive is withdrawn from the core. The thermal sleeves over time wear due to vibration and eventually fail. Conventionally, the RVCH is removed from the vessel and placed on a head stand, then the CRDM is fully removed and the thermal sleeve is replaced.

FR 2689297 discloses a tool designed to allow the sleeve replacement without removing the CRD, which involves using a replacement sleeve that comprises an outer flange and an inner flange constituting the bearing portion for the replacement sleeve.

PCT/US18/27663 and PCT/US18/27668 disclose methods and devices for replacing CRDM thermal sleeves.

SUMMARY OF THE INVENTION

A method for replacing a damaged sleeve lining a tube passing through a nuclear reactor pressure vessel is provided. The damaged sleeve has an end including a radially enlarged end portion configured for resting on a support section of the tube for retaining the damaged sleeve in the tube. The method includes removing the damaged sleeve from the tube; providing a sleeve assembly including a first sleeve with a radially variable end configured for being deformed between a radially contracted configuration and a radially expanded configuration and a retainer configured for being deformed between an installation configuration and a retention configuration; installing the sleeve assembly in the tube such that the radially variable end of the first sleeve is received by the support section, the radially variable end being in the radially contracted configuration during installation and being in the radially expanded configuration after the sleeve assembly is installed in the tube; and deforming the retainer from the installation configuration to the retention configuration to retain the radially variable end of the first sleeve in the radially expanded configuration.

In one or more embodiments, the method may include following features:
the installing of the sleeve assembly includes inserting the radially variable end of the first sleeve in the radially contracted configuration in a first end of the tube;
the radially variable end of the first sleeve is in the radially expanded configuration in a second end of the tube after installation;
the first end of the tube is a lower end of the tube and the second end of the tube is an upper end of the tube;
the retainer is a second sleeve held in the radially variable end of the first sleeve during the installing of the sleeve assembly in the tube;
the second sleeve includes a radially variable end configured for being deformed between a radially contracted configuration and a radially expanded configuration;
the second sleeve is in the radially contracted configuration in the installation configuration and is in the radially expanded configuration in the retention configuration;
the radially variable end of the first sleeve includes a plurality first segments circumferentially spaced from each other by first slots and the radially variable end of the second sleeve includes a plurality second segments circumferentially spaced from each other by second slots;
the first segments and the second segments are flexible radially inward and radially outward;
the deforming of the retainer from the installation configuration to the retention configuration to retain the radially variable end of the first sleeve in the radially expanded configuration includes intermeshing the first segments and the second segments;
each of the circumferentially spaced first segments includes a radially outwardly extending first protrusion resting on the support section after the sleeve assembly is installed in the tube and each of the circumferentially spaced second segments includes a radially outwardly extending second protrusion resting on the support section after the sleeve assembly is installed in the tube;
the first protrusions are circumferentially spaced apart from each other by the first slots and the second protrusions are circumferentially spaced apart from each other by the second slots;
the intermeshing the first segments and the second segments includes aligning the first segments and the second segments such that each of the first protrusions is received in one of the second slots and each of the second protrusions is received one of the first slots;
the deforming of the retainer from the installation configuration to the retention configuration to retain the radially variable end of the first sleeve in the radially expanded configuration includes deforming the second segments to force the second protrusions radially outward from each other and pulling the second sleeve downward so each of the second protrusions is in one of the first slots and the first and second protrusions are in axial alignment with each other;
each of the second segments is provided with a projection extending radially outward from the second segment;
each of the projections is received in one of the first slots during the installing of the sleeve assembly in the tube and the deforming of the retainer from the installation configuration to the retention configuration;
the first sleeve includes a funnel at an end thereof that is opposite of the radially variable end;
the funnel is part of the first sleeve during the installing of the sleeve assembly in the tube;
the tube is a control rod drive mechanism nozzle passing through a closure head of the nuclear reactor pressure vessel; and/or
the closure head being separated from a cylindrical shell of the nuclear reactor pressure vessel during the installing of the sleeve in the tube.

A control rod drive mechanism thermal sleeve for insertion into a control rod drive mechanism nozzle of a nuclear reactor pressure vessel is also provided. The control rod drive mechanism thermal sleeve includes a first sleeve including a radially variable end configured for being deformed between a radially contracted configuration and a radially expanded configuration. The radially variable end is configured for retaining the sleeve in the control rod drive mechanism nozzle in the radially expanded configuration. The first sleeve also includes a further end opposite of the radially variable end. The further end includes a funnel having a frustoconical portion having a maximum diameter edge defining an end edge of the further end. The control rod drive mechanism thermal sleeve also includes a retainer configured for being deformed between an installation configuration and a retention configuration. The retainer is configured for retaining the first sleeve in the radially expanded configuration in the retention configuration.

In one or more embodiments, the control rod drive mechanism thermal sleeve may include following features:
the retainer is a second sleeve held in the radially variable end of the first sleeve in the installation configuration and the retention configuration;
the second sleeve includes a radially variable end configured for being deformed between a radially contracted configuration and a radially expanded configuration;
the second sleeve is in the radially contracted configuration in the installation configuration and being in the radially expanded configuration in the retention configuration;
the radially variable end of the first sleeve includes a plurality first segments circumferentially spaced from each other by first slots and the radially variable end of the second sleeve includes a plurality second segments circumferentially spaced from each other by second slots;
the first segments and the second segments are flexible radially inward and radially outward;
the first segments and the second segments are configured for being intermeshed in the retention configuration of the second sleeve;
each of the circumferentially spaced first segments includes a radially outwardly extending first protrusion and each of the circumferentially spaced second segments includes a radially outwardly extending second protrusion;
the first segments and the second segments are intermeshed by each of the first protrusions being received in one of the second slots and each of the second protrusions is received one of the first slots;
each of the second segments is provided with a projection extending radially outward from the second segment; and/or
each of the projections is configured for being received in one of the first slots in the installation configuration and the retention configuration.

BRIEF DESCRIPTION OF THE DRAWINGS

The present invention is described below by reference to the following drawings, in which:

FIGS. 5a, 5b and 5c show different views of a retainer in the form of a second sleeve in accordance with an embodiment of the present invention;

DETAILED DESCRIPTION

The present disclosure provides a replacement thermal sleeve including a first sleeve including a funnel on a lower end and a second sleeve forming a retainer for retaining the first sleeve and a method of replacing a damaged thermal sleeve in a nuclear reactor pressure vessel by locking the first sleeve and the second sleeve in position in a CRDM nozzle through intermeshing of the first and second sleeves with each other. After the intermeshing of the first and second sleeves, the first and second sleeves may be attached by means such as roll expansion, deformation, or welding.

Figure 1:
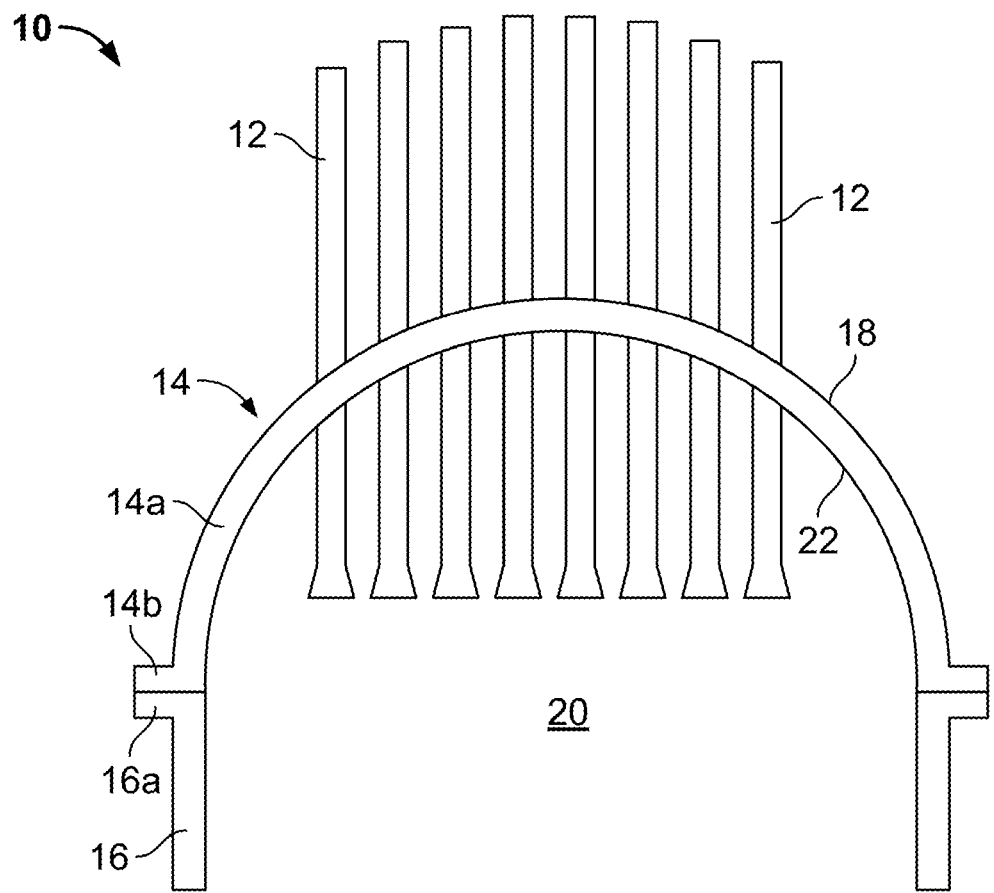
FIG. 1 schematically shows a cross-sectional view of a nuclear reactor pressure vessel of a PWR including a plurality of CRDM tube assemblies extending upward from the pressure vessel.

FIG. 1 schematically shows a cross-sectional view of a nuclear reactor pressure vessel 10 of a pressurized water reactor (PWR) including a plurality of CRDM tube assemblies 12 extending upward from pressure vessel 10. Pressure vessel 10 includes a RVCH 14 including a hemispherical wall 14a positioned atop a flange 14b, with CRDM tube assemblies 12 passing through hemispherical wall 14a. RVCH 14 is removably fixed on top of a cylindrical shell 16 via flange 14b of RVCH 14 being fixed to a flange 16a of cylindrical shell 16 by studs and nuts. Hemispherical wall 14a includes an exterior hemispherical surface 18 facing away from an interior 20 of pressure vessel 10 and an interior hemispherical surface 22 facing toward interior 20. CRDM tube assemblies 12 extend through both exterior hemispherical surface 18 and interior hemispherical surface 22. During operation of the nuclear reactor, RVCH 14 is fixed on top of a cylindrical shell 16. During refueling operations, RVCH 14 is removed from cylindrical shell 16.

Figure 2:
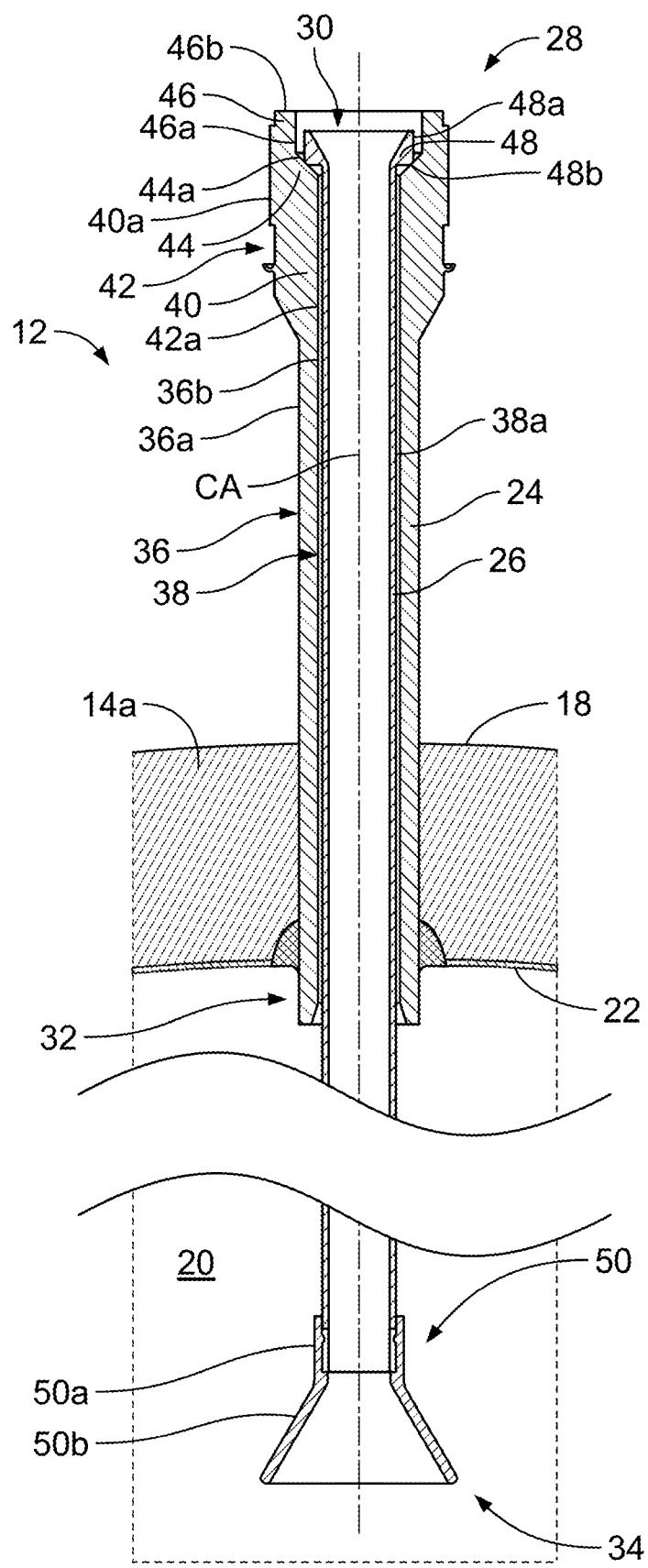
FIG. 2 shows a cross-sectional view of a closure head of the nuclear reactor pressure vessel illustrating the detail of a nozzle and a thermal sleeve of a conventional CRDM tube assembly.

FIG. 2 shows a cross-sectional view of RVCH 14 illustrating the details of a CRDM tube assembly 12 interrupted by break lines. CRDM tube assembly 12 includes an outer tube in the form of a nozzle 24 permanently fixed in wall 14a and a thermal sleeve 26 lining nozzle 24. Nozzle 24 passes through a corresponding hole formed in wall 14a and is welded to wall 14a.

CRDM tube assembly 12 is positioned such that a center longitudinally extending axis CA of the CRDM tube assembly 12 extends vertically through wall 14a. The terms axially, radially and circumferentially as used herein are used with respect to center axis CA for CRDM tube assembly 12. CRDM tube assembly 12 protrudes longitudinally past hemispherical surface 18 such that a first end 28 of nozzle 24 and a first end 30 of sleeve 26 are positioned outside of pressure vessel 10. CRDM tube assembly 12 also protrudes longitudinally past hemispherical surface 22 such that a second end 32 of nozzle 24 and a second end 34 of sleeve 26 are positioned in interior 20 of pressure vessel 10.

Nozzle 24 includes an intermediate portion 36 extending from first end 28 to second end 32 through wall 14a and sleeve 26 includes an intermediate portion 38 extending from first end 30 to second end 34 through wall 14a.

First end 28 of nozzle 24 extends vertically upward further than first end 30 of sleeve 26 away from wall 14a. First end 28 of nozzle 24 includes a radially enlarged annular portion 40 that is radially thicker than intermediate portion 36 of nozzle 24 and has an outer circumferential surface 40a that is radially further away from center axis CA than an outer circumferential surface 36a of intermediate portion 36. Radially enlarged annular portion 40 includes a lower section 42 having an inner circumferential surface 42a of a same diameter as an inner circumferential surface 36b of intermediate portion 36. Above lower section 42, an inner diameter of enlarged annular portion 40 defines a radially enlarged support section 44 formed as an annular shoulder having a frustoconical inner circumferential support surface 44a extending radially away from inner circumferential surface 42a while extending axially upward to join an inner circumferential surface 46a of an upper section 46 of enlarged annular portion 40. Upper section 46 defines a top edge 46b of nozzle 24.

First end 30 of sleeve 26 includes a radially enlarged annular portion 48 that is radially thicker than intermediate portion 38 of thermal sleeve 26 and has an outer circumferential surface 48a that is radially further away from center axis CA than an outer circumferential 38a of intermediate portion 38. Radially enlarged annular portion 48 is supported by support section 44 of radially enlarged annular portion 40 of nozzle 24. More specifically, radially enlarged annular portion 48 includes a lower surface 48b that rests vertically on support surface 44a. Over time, due to vibrations experienced by thermal sleeve 26, failure can occur at radially enlarged portion 48.

Second end 34 of sleeve 26 extends vertically downward further than second end 32 of nozzle 24 away from wall 14a. Second end of sleeve 26 is formed by a funnel 50 that is fixed to intermediate portion 38. Funnel 50 includes a cylindrical section 50a this is fixed to outer circumferential surface 38a of intermediate portion and a frustoconical section 50b extending downward from cylindrical section 50a. Frustoconical section 50b enlarges radially as it extends downward vertically away from intermediate portion 38. Second end 32 of nozzle 24 is substantially cylindrically shaped and surrounds a section of intermediate portion 38 of sleeve 26.

Figure 3:
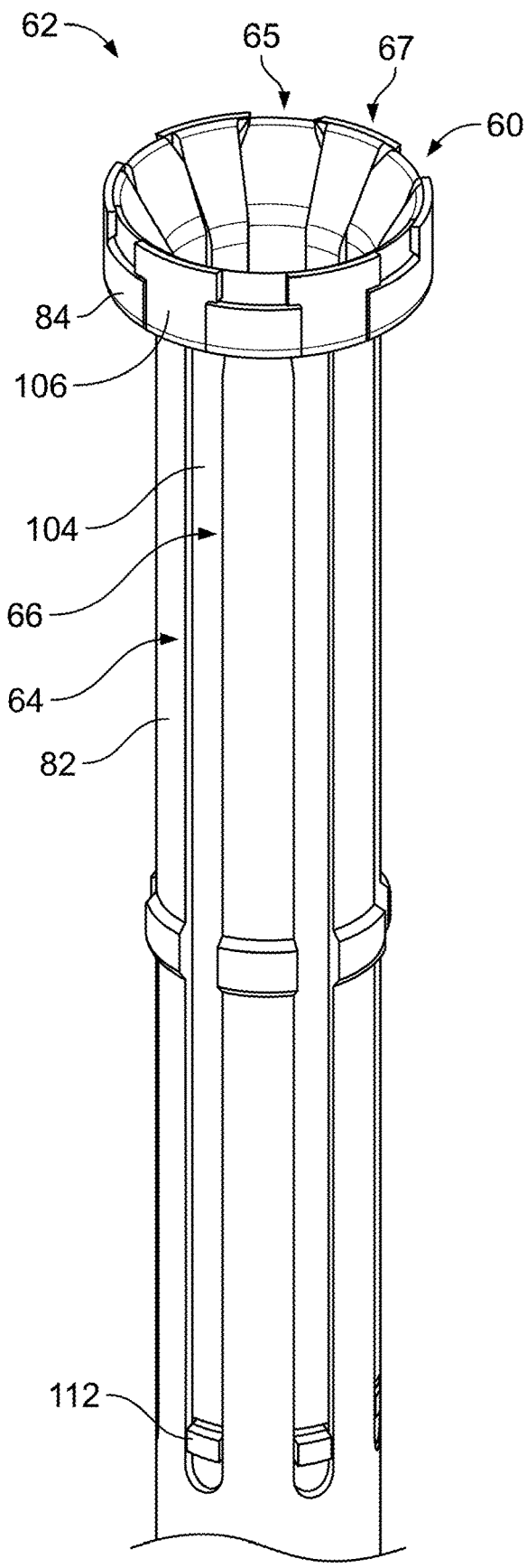
FIG. 3 shows a perspective view of an upper end of a thermal sleeve assembly in accordance with an embodiment of the present invention.

FIG. 3 shows a perspective view of an upper end 60 of a new or replacement thermal sleeve assembly 62 in accordance with an embodiment of the present invention. Thermal sleeve assembly 62 includes a first sleeve 64 including a funnel 72 (FIG. 4c) on a lower end and a second sleeve 66 forming a retainer for retaining the first sleeve 64 in nozzle 24. In one preferred embodiment, sleeves 64, 66 are both formed of a metal, which may be more specifically stainless steel.

FIG. 3 shows first sleeve 64 and second sleeve 66 connected together such that sleeves 64, 66 are nonrotatably fixed with respect to each other and are intermeshed with each other at respective upper ends 65, 67. Besides the differences between upper end 60 of thermal sleeve assembly 62 and upper end 28 of thermal sleeve 26, thermal sleeve assembly 62 is configured in the same manner as original thermal sleeve 26. More specifically, besides the differences between an upper end 65 of first sleeve 64 and upper end 28 of thermal sleeve 26, first sleeve 64 is configured in the same manner as original thermal sleeve 26.

Figure 4A:
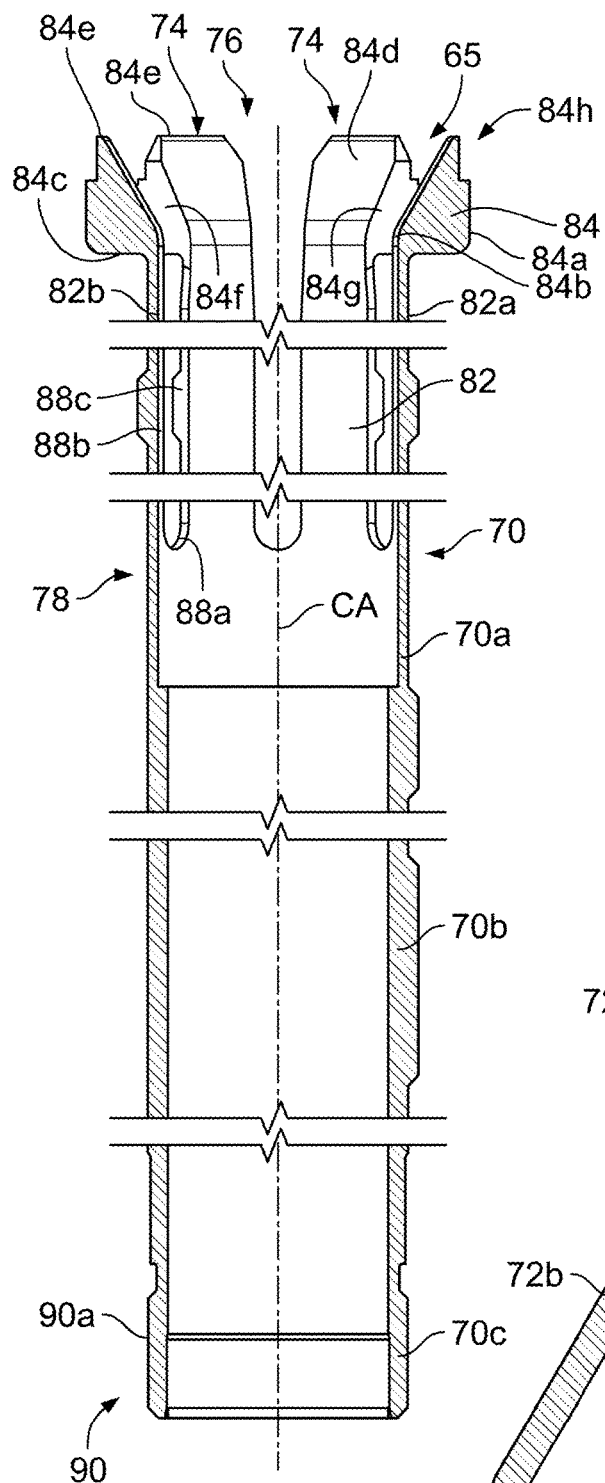
FIGS. 4a and 4b show different views of a first sleeve in accordance with an embodiment of the present invention.
Figure 4B:
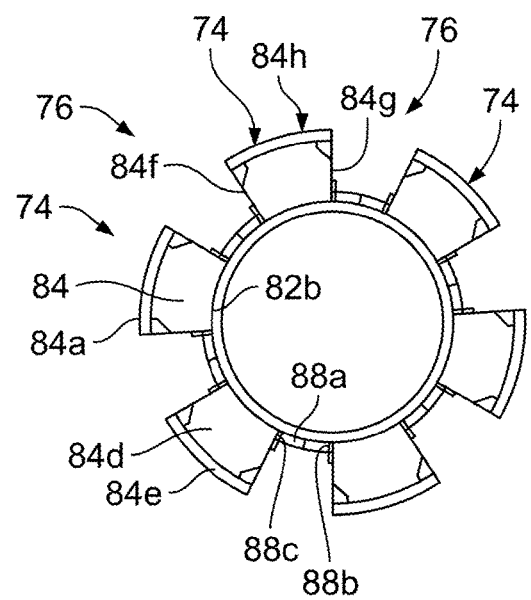
Figure 4C:
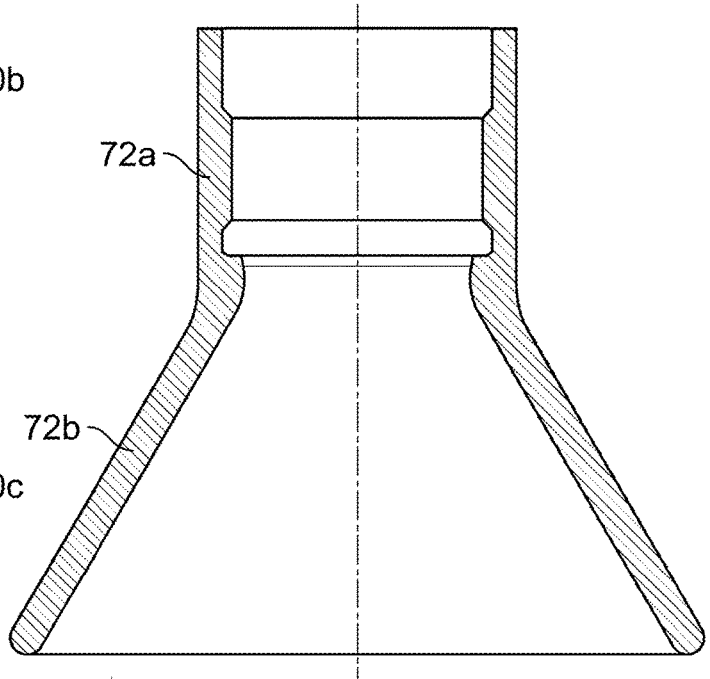
FIG. 4c shows a view of a funnel for connecting to the first sleeve.

FIGS. 4a and 4b show different views of first sleeve 64 and FIG. 4c shows a view of a funnel 72 for connecting to first sleeve 64. FIG. 4a shows a cross-sectional side view of first sleeve 64, FIG. 4b shows a top plan view of first sleeve 64, and FIG. 4c shows a cross-sectional side view of funnel 72.

As shown in FIGS. 4a and 4b, upper end 65 of first sleeve 64 includes a plurality of circumferentially spaced first segments 74 separated from each other by circumferentially spaced axially extending first slots 76 extending upwardly from a cylindrical base section 70 of first sleeve 64. Cylindrical base section 70 includes a top portion 70a for receiving a cylindrical base section 96 of second sleeve 66 (FIGS. 5a to 5c), an intermediate portion 70b and a bottom portion 70c defining a lower end 90 of first sleeve 64. Each of segments 74 includes a first lower base end 78 joining top portion 70a of cylindrical base section 70 and a longitudinally extending first prong 82 extending axially upward from lower base end 78. For each first segment 74, at upper end 65, each first prong 82 joins a radially outward first protrusion 84 that extends radially outward past an outer circumferential surface 82a of the respective prong 82, such that an outer circumferential surface 84a of each protrusion 84 is further radially from center axis CA than outer circumferential surface 82a. Radially outward protrusions 84 form a radially enlarged end portion of sleeve 64.

Each of protrusions 84 is radially thicker than prongs 82 and cylindrical base section 70. As shown in FIG. 4a, an innermost circumferential surface 84b of each protrusion 84 is substantially the same radial distance from center axis CA as an inner circumferential surface 82b of the respective prong 82. Protrusions 84 are configured for being supported by support section 44 of radially enlarged annular portion 40 of nozzle 24 (FIG. 2). More specifically, each of protrusions 84 includes a lower surface 84c configured to rest vertically on support surface 44a of support section 44 (FIG. 2). Protrusions 84 each include a tapered surface 84d, which in the embodiment shown in FIG. 4a is semi-frustoconically shaped, extending radially outward from innermost circumferential surface 84b to an upper surface 84e. Each protrusion 84 also includes two opposite circumferentially facing side edges 84f, 84g. Tapered surface 84d of each protrusion 84 extends circumferentially from a first edge 84f to second edge 84g of the respective protrusion 84. Outer circumferential surface 84a of each protrusion 84 has two different outer diameters, defining a stepped section 84h for receiving wings 108, 109 described below with respect to FIGS. 5a and 5b.

Slots 86 are each defined by a circumferentially extending base edge 88a, which is at a top of top portion 70a of cylindrical base section 70, two axially extending longitudinal edges 88b, 88c, which extend axially upward from base edge 88a and two side edges 84f, 84g. A first longitudinal edge 88b extends axially upward from base edge 88a to a respective upper side edge 84f of one of protrusions 84 and a second longitudinal edge 88c extends axially upward from base edge 88a to a respective side edge 84g of another of protrusions 84. For each slot 86, each edge 88b forms the lateral edge of the prong 82 of one of segments 84 and each edge 88c forms the lateral edge of the prong 82 84 of another of segments 84. Edges 88b, 88c each extend radially from inner circumferential surface 82b to outer circumferential surface 82a of the respective prong 82.

First sleeve 64 is configured such that upper end 65 is configured as a radially variable end that is deformable such that the radius of the radially variable end can be varied. More specifically, upper end 65 is radially expandable and radially compressible between a radially contracted configuration, in which upper end 65 has a smaller outer diameter, and a radially expanded configuration, in which upper end 65 has a larger outer diameter. More specifically, segments 74 are configured such that segments 74 are radially flexible. Segments 74 are deformable radially inward to orient upper end 65 in the radially contracted configuration and are deformable radially outward to orient upper end 65 in the radially expanded configuration. In one preferred embodiment, segments 74 are configured with a sufficient resiliency such that an externally applied radially inward force applied to segments 74 moves upper end 65 into the radially contracted configuration and the construction of segments 74 generates the radially outward force that is sufficient to move upper end 65 from the radially contracted configuration to the radially expanded configuration when the externally applied radially inward force is removed. In an alternative embodiment, segments 74 are configured with a sufficient resiliency such that an externally applied radially outward force moves upper end 65 into the radially expanded configuration and the construction of segments 74 generates the radially inward force that is sufficient to move upper end 65 from the radially expanded configuration to the radially contracted configuration when the externally applied radially inward force is removed. In another alternative embodiment, segments 74 are configured such that an externally applied radially inward force is required to move upper end 65 into the radially contracted configuration and no externally applied radially outward force is required to move upper end 65 into the radially expanded configuration.

Referring to FIG. 4c, like funnel 50 shown in FIG. 2, funnel 72 includes a cylindrical section 72a that is configured for being fixed to an outer circumferential surface 90a of lower end 90 of first sleeve 64 and a frustoconical section 72b extending downward from cylindrical section 50a.

FIGS. 5a, 5b and 5c show different views of a retainer in the form of a second sleeve 66. FIG. 5a shows a cross-sectional side view of second sleeve 66, FIG. 5b shows a top plan view of second sleeve 66 and FIG. 5c shows a side view of a bottom portion of second sleeve 66.

As shown in FIGS. 5a and 5b, upper end 67 of second sleeve 66 includes a plurality of circumferentially spaced second segments 92 separated from each other by circumferentially spaced axially extending second slots 94 extending upwardly from a cylindrical base section 96 of second sleeve 66. Cylindrical base section 96 defines an intermediate portion 98 and a lower end 100 of second sleeve 66. Each of second segments 92 includes a lower base end 102 joining a top of intermediate portion 98 of second sleeve 66 and a longitudinally extending second prong 104 extending axially upward from lower base end 102. For each segment 92, at upper end 67, each second prong 104 joins a radially outward second protrusion 106 that extends radially outward past an outer circumferential surface 104a of the respective prong 104, such that an outer circumferential surface 106a of each protrusion 106 is further radially from center axis CA than outer circumferential surface 104a. Radially outward protrusions 106 form a radially enlarged end portion of sleeve 66.

Each of protrusions 106 is radially thicker than prongs 104 and cylindrical base section 96. As shown in FIG. 5a, an innermost circumferential surface 106b of each protrusion 106 is substantially the same radial distance from center axis CA as an inner circumferential surface 104b of the respective prong 104. Protrusions 106 are configured for being supported by support section 44 of radially enlarged annular portion 40 of nozzle 24 (FIG. 2). More specifically, each of protrusions 106 includes a lower surface 106c configured to rest vertically on support surface 44a of support section 44 (FIG. 2). Protrusions 106 each include a tapered surface 106d, which in the embodiment shown in FIG. 4a is semi-frustoconically shaped, extending radially outward from innermost circumferential surface 106b to an upper surface 106e. Each protrusion 106 also includes two opposite circumferentially facing side edges 106f, 106g. Tapered surface 106d of each protrusion 106 extends circumferentially from a first edge 106f to second edge 106g of the respective protrusion 106. Each protrusion 106 is provided with two circumferentially extending wings 108, 109 extending circumferentially from opposite sides of the respective protrusion 106. More specifically, each protrusion 106 includes a first wing 108 extending circumferentially from the first edge 106f and a second wing 109 extending circumferentially from the second edge 106g.

Slots 94 are each defined by a circumferentially extending base edge 110a, which is at a top of intermediate portion 98 of base section 96, two axially extending circumferentially facing longitudinal edges 110b, 110c, which extend axially upward from base edge 110a, and two side edges 106f, 106g. A first longitudinal edge 110b extends axially upward from base edge 110a to a respective side edge 106f of one of protrusions 106 and a second longitudinal edge 110c extends axially upward from base edge 110a to a respective side edge 106g of another of protrusions 106. For each slot 94, each edge 110b forms the lateral edge of the prong 104 of one of segments 92 and each edge 110c forms the lateral edge of the prong 104 and protrusion 106 of another of segments 92. Edges 110b, 110c each extend radially from inner circumferential surface 104b to outer circumferential surface 104a of the respective prong 104 and from innermost circumferential surface 106b to outer circumferential surface 106a of the respective protrusion 106.

Second sleeve 66 is a retainer configured for being deformed between an installation configuration and a retention configuration. In particular, second sleeve 66 is configured such that upper end 67 is configured as a radially variable end that is deformable such that the radius of the radially variable end can be varied. More specifically, upper end 67 is radially expandable and radially compressible between a radially contracted configuration, in which upper end 67 has a smaller outer diameter, and a radially expanded configuration, in which upper end 67 has a larger outer diameter. More specifically, segments 92 are configured such that segments 92 are radially flexible. Second sleeve 66 is in the radially contracted configuration in the installation configuration and is in the radially expanded configuration in the retention configuration. Segments 92 are deformable radially inward to orient upper end 67 in the radially contracted configuration and are deformable radially outward to orient upper end 67 in the radially expanded configuration. In one preferred embodiment, segments 92 are configured with a sufficient resiliency such that an externally applied radially inward force applied to segments 92 moves upper end 67 into the radially contracted configuration and the construction of segments 92 generates the radially outward force that is sufficient to move upper end 67 from the radially contracted configuration to the radially expanded configuration when the externally applied radially inward force is removed. In an alternative embodiment, segments 92 are configured with a sufficient resiliency such that an externally applied radially outward force moves upper end 67 into the radially expanded configuration and the construction of segments 92 generates the radially inward force that is sufficient to move upper end 67 from the radially contracted configuration to the radially expanded configuration when the externally applied radially inward force is removed. In another alternative embodiment, segments 92 are configured such that an externally applied radially inward force is required to move upper end 67 into the radially contracted configuration and no externally applied radially outward force is required to move upper end 67 into the radially expanded configuration.

FIG. 5c illustrates that a bottom portion of second sleeve 66 is provided with a plurality of circumferentially spaced radial projections 112 configured for being received in slots 76 of first sleeve 64 to maintain the alignment of sleeves 64, 66 with respect to each other. Projections 112 are provided at a lower base end 102 of segments 92, i.e., on the bottom of prongs 104. Projections 112 extend radially outward from outer circumferential surface 104a of prongs 104. Projections 112 limit the rotational movement of second sleeve 66 with respect to first sleeve 64 during installation of sleeve assembly 62 on nozzle 26 (FIGS. 2 to 3b). More specifically, axially extending circumferentially facing edges 112a, 112b of projections 112 are configured for circumferentially contacting axially extending circumferentially facing longitudinal edges 88b, 88c limit the rotational movement of second sleeve 66 with respect to first sleeve 64 during installation of sleeve assembly 62 on nozzle 26.

In the embodiment shown in FIGS. 3 to 5c, sleeves 64, 66 are configured such that each protrusion 84 of first sleeve 64 is configured for insertion in one of slots 94 of second sleeve 66 directly between two protrusions 106 of second sleeve 66 and each protrusion 106 of second sleeve 66 is configured for insertion in one of slots 76 of first sleeve 64 directly between two protrusions 84 of first sleeve 64. In particular, each protrusion 84 of first sleeve 64 has approximately the same circumferential width as each slot 94 at the height of protrusions 106 when sleeve 66 is in the radially expanded configuration and each protrusion 106 of second sleeve 66 has approximately the same circumferential width as each slot 76 at the height of protrusions 84 when sleeve 64 is in the radially expanded configuration. As shown in FIG. 3, when both of sleeves 64, 66 are in their installed positions in nozzle 26, each of protrusions 84 of first sleeve 64 is received in one of slots 94 of second sleeve 66 directly between two protrusions 106 of second sleeve 66 and each protrusion 106 of second sleeve 66 is received in one of slots 76 of first sleeve 64 directly between two protrusions 84 of first sleeve 64. In these installed positions, each of protrusions 84 circumferentially contacts the two adjacent protrusions 106 and each of protrusions 106 circumferentially contacts the two adjacent protrusions 84. More specifically, in the installed positions of sleeves 64, 66, each circumferentially facing side edge 84f contacts one circumferentially facing side 106f and each circumferentially facing side edge 84g contacts one circumferentially facing side 106g. Segments 74 are wedged in between segments 92 in an intermeshed manner to fix sleeves 64, 66 rotationally together. In particular, protrusions 106 are wedged in between protrusions 84 an intermeshed manner such that sleeves 64, 66 are rotationally fixed together. In the installed positions of sleeves, wings 108, 109 engage in stepped sections 84h to help lock sleeves 64, 66 together.

A method of replacing sleeve 26 with sleeve assembly 62 in accordance with an embodiment of the present invention will now be described with respect to FIGS. 1 to 8. First, RVCH 14 is first removed from shell 16 and placed on a head stand to perform sleeve replacement so that it is easy to access the lower end 32. Next, sleeve 26 is removed from nozzle 24. In one preferred embodiment, radially enlarged portion 48 of sleeve 26 is broken apart such that sleeve 26 can be pulled downward through nozzle 24 out of lower end 32 from below the RVCH 14 while on the head stand. Sleeve assembly 62 is configured to be inserted into nozzle 24 from lower end 32 while on the head stand.

The method includes providing sleeve assembly 62 into an interior of RVCH 14. Funnel 72 can be installed on lower end 90 of first sleeve 64 before funnel 72 is provided into the interior of RVCH 14. Second sleeve 66 is installed inside of first sleeve 64 through upper end 65 of first sleeve 64 coaxially with first sleeve 64 before sleeves 64, 66 are inserted into nozzle 24. Second sleeve 66 is inserted lower end 100 first through upper end 65 of first sleeve 64 with segments 74 radially aligned with slots 94 and with segments 92 radially aligned with slots 76 by sliding projections 112 into slots 76. Second sleeve 66 is slid axially into first sleeve 64 such that protrusions 84 are positioned axially offset from, in particular vertically higher than, protrusions 106.

Then, sleeve assembly 62 is installed in nozzle 24 such that the radially variable end 65 of first sleeve 64 and the radially variable end 67 of second sleeve 66 are received by support section 44. The radially variable ends 65, 67 are in the radially contracted configuration during installation and are in the radially expanded configuration after sleeve assembly 62 is installed in nozzle 24.

Figure 6A:
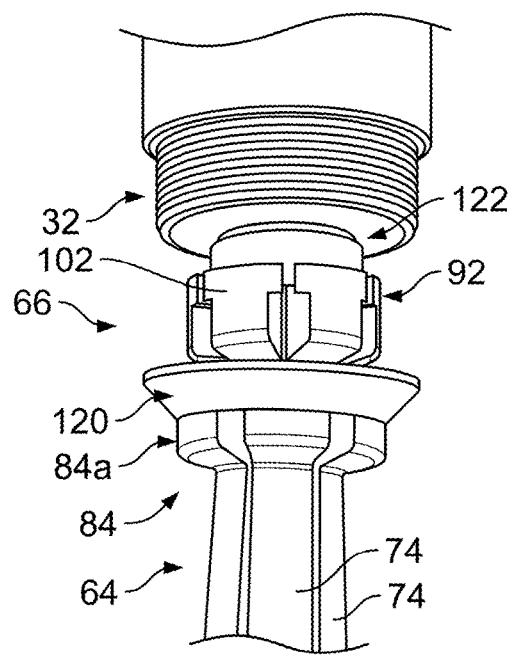
FIGS. 6a to 6e illustrate the installation of the thermal sleeve assembly shown in FIGS. 3 to 5c in a nozzle.

The installation first includes, with protrusions 84 positioned axially offset from protrusions 106 and upper ends 65, 67 each in the radially contracted configuration, upper end 60 of sleeve assembly 62 is inserted into lower end 32 of nozzle 24. A radially inward force can be applied to segments 74 to orient upper end 65 of first sleeve 64 in the radially contracted configuration and a radially inward force can be applied to segments 92 to orient upper end 67 of second sleeve 66 in the radially contracted configuration, such that an outermost diameter of upper end 65 of first sleeve 64, as defined by a maximum distance between outer circumferential surfaces 84a of protrusions 84, is smaller than an inner diameter of nozzle 24 at lower end 32 and an outermost diameter of upper end 67 of second sleeve 66, as defined by a maximum distance between outer circumferential surfaces 106a of protrusions 106, is smaller than the inner diameter of nozzle 24 at lower end 32. For example, after second sleeve 66 is installed inside of first sleeve 64, as shown in FIG. 6a, a compression tool 120, which in FIG. 6a is a ring, can be installed on outer circumferential surfaces 84a of protrusions 84 in stepped sections 84h. The installation of compression tool 120 forces segments 74 to elastically deform radially inward, which causes segments 74 to contact segments 92, at prongs 104, and also force segments 92 to elastically deform radially inward. After compression tool 120 is installed, segments 74, 92 are held by compression tool 120 such that variable end 65 of first sleeve 64 is held in the radially contracted configuration by compression tool 120 and variable end 67 of first sleeve 66 is in the radially contracted configuration by compression tool 120. Then, with upper ends 65, 76 of sleeves 64, 66 in their radially contracted configuration, sleeve assembly 62 is forced upward through second end 32 of nozzle 24. After upper ends 65, 67 of sleeves 64, 66 are inserted into second end 32 of nozzle 24, compression tool 120 can be removed from ends 65, 67 of sleeves 64, 66 by sliding compression tool 120 downward.

Figure 7:
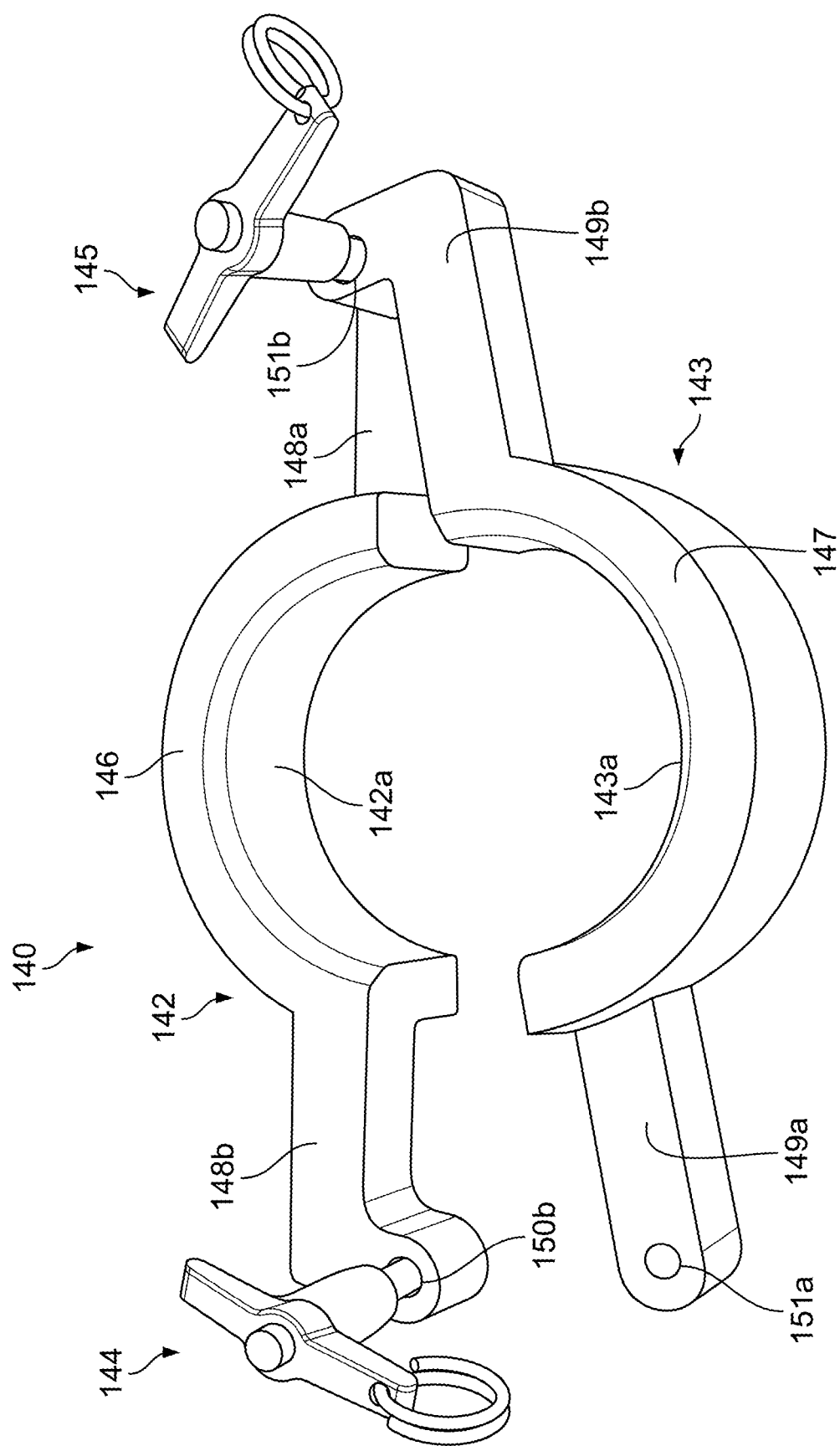
FIG. 7 shows a perspective view of a compression tool used in accordance with an embodiment of the present invention.

FIG. 7 shows another embodiment of a compression tool 140 that can be used to elastically deform segments 74, 92 radially inward. Compression tool 140 is in the form of a quick connect clamp that includes two clamping section 142, 143 that are held together by two fasteners 144, 145. In particular, each clamping section 142, 143 includes a respective semi-circular contact portion 146, 147 having an inner circumferential surface 142a, 143a for contacting outer circumferential surfaces 84a of protrusions 84 in stepped sections 84h and two fastening portions 148a, 148b, 149a, 149b extending radially outward from the respective contact portion 146, 147 at opposite circumferential ends of the respective contact portion 146, 147. Each fastening portion 148a, 148b, 149a, 149b includes a respective hole 150b, 151a, 151b (view of the hole of 148a is obstructed) passing axially therethrough for receiving a respective fastener 144, 145.

In the view shown in FIG. 7, the hole of fastening portion 148a of clamping section 142 is aligned with hole 151b of the fastening portion 149b of clamping section 143, and the fastener 145 is passed through both of the hole of fastening portion 148a and hole 151b together. Fastener 144 is received in hole 150b, but is not received in hole 151a, such that clamping sections 142, 143 can be rotated together about fastener 145 to clamp the clamping section 142, 143 onto ends 65, 67 of sleeves 64, 66 to compress segments 74, 92 radially inward. Once clamping sections 142, 143 having elastically deformed ends 65, 67 of sleeves 64, 66 into the radially contracted configuration, fastener 144 is introduced into hole 151a to hold ends 65, 67 of sleeves 64, 66 in the radially contracted configuration. After upper ends 65, 67 of sleeves 64, 66 are inserted into second end 32 of nozzle 24, fastener 144 can be pulled out of hole 151a and compression tool 140 can be removed from sleeves 64, 66.

Figure 6B:
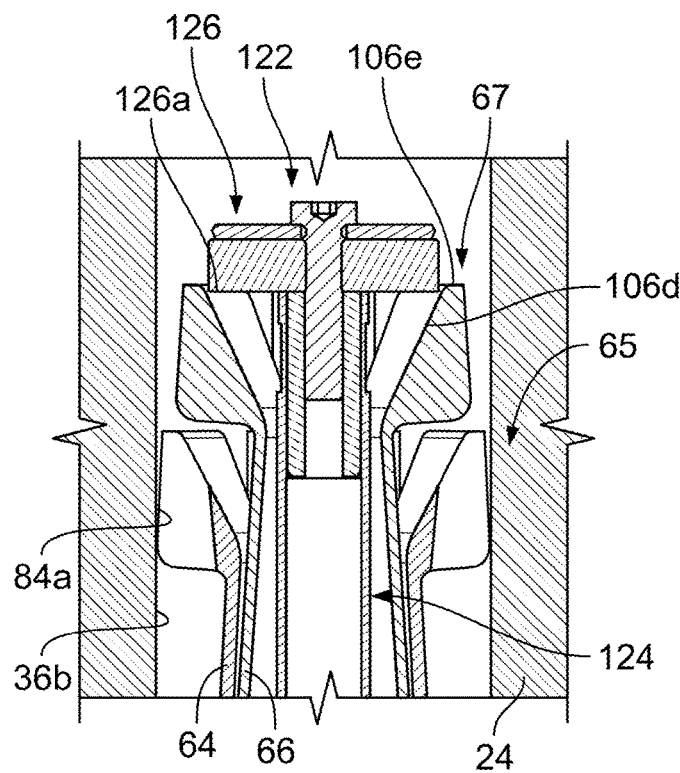

More specifically, as schematically shown in FIG. 6b, after compression tool 120 or 140 is removed, during the installation of sleeve assembly 62 in nozzle 24, variable ends 65, 67 of sleeves 64, 66, respectively, are held in the radially contracted configuration by inner circumferential surface 36b of nozzle 24 contacting outer circumferential surfaces 84a of protrusions 84 as sleeves 64, 66 are moved upward through nozzle 24. As shown in FIG. 6b, during installation an expansion tool 122 may be received inside of sleeves 64, 66. Expansion tool 122 includes a pole 124 that has an outer diameter that is less than an innermost diameter of segments in the radially contracted configuration and a head 126 at the end of pole 124. Head 126 has an outer diameter that is greater than the innermost diameter of segments in the radially contracted configuration. As sleeves 64, 66 are slid upward through nozzle 24, pole 124 is inside of sleeves 64, 66 and head 126 is positioned above sleeve 64 and above a majority of sleeve 66. As shown in FIG. 6b, a bottom edge 126a of head 126 may be positioned below upper surface 106e of protrusions 106 and facing surfaces 106d. FIG. 6d shows upper ends 65, 67 of sleeves 64, 66 after they reach radially enlarged support section 44 at the upper end 28 of nozzle 24, before upper ends 65, 67 are radially expanded.

After upper ends 65, 67 of sleeves 64, 66 reach radially enlarged support section 44, upper end 65 of sleeve 64 is radially expanded into the radially expanded orientation and second sleeve 66 is elastically deformed from the installation configuration to the retention configuration to retain end 65 of first sleeve 64 in the radially expanded configuration such that sleeves 64, 66.

Figure 6C:
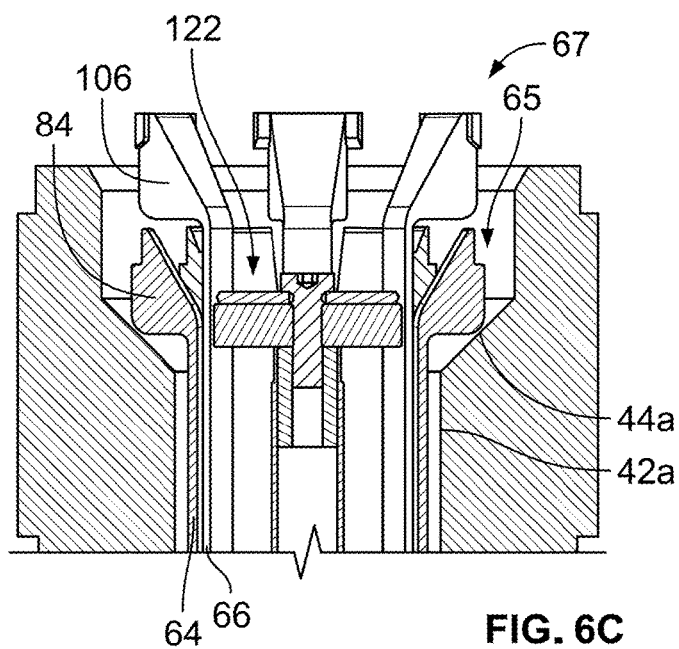
Figure 6D:
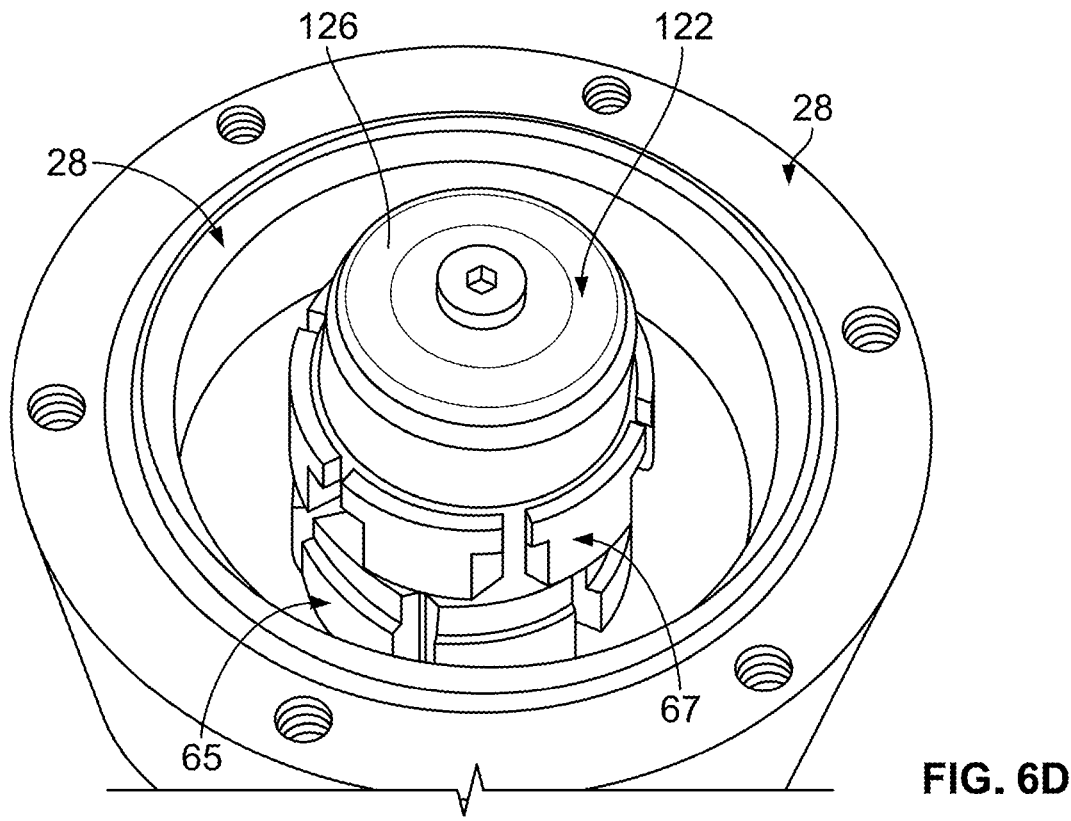

The deformation into the installation configured first involves, once upper ends 65, 67 of sleeves 64, 66 are above support surface 44a of nozzle 24, moving both of sleeves 64, 66 into the orientation shown in FIG. 6c—upper end 65 of sleeve 64 is radially expanded into the radially expanded orientation, such that outer circumferential surfaces 84a of protrusions 84 are positioned further radially away from center axis CA than inner circumferential surface 42a, and upper end 67 of sleeve 68 is radially expanded into the radially expanded orientation, such that outer circumferential surfaces 106a of protrusions 106 are positioned further radially away from center axis CA than inner circumferential surface 42a.

This may be performed by pulling expansion tool 122 downward, such that bottom edge 126a contacts surfaces 106d of segments 92 and upper end 67 of sleeve 66, in particular segments 92, is forced radially outward. As upper end 67 of sleeve 66 is forced radially outward, outer circumferential surfaces of segments 92 contact inner circumferential surfaces of segments 74, and upper end 65 of sleeve 64, in particular protrusions 84, is forced radially outward. Upper end 67 of sleeve 66, in the radially expanded orientation, is then pulled downward such that protrusions 106 are pulled into slots 76 and in axial alignment with protrusions 84, while protrusions 84 enter into slots 94, causing segments 74 to be intermeshed with segments 92.

Figure 6E:
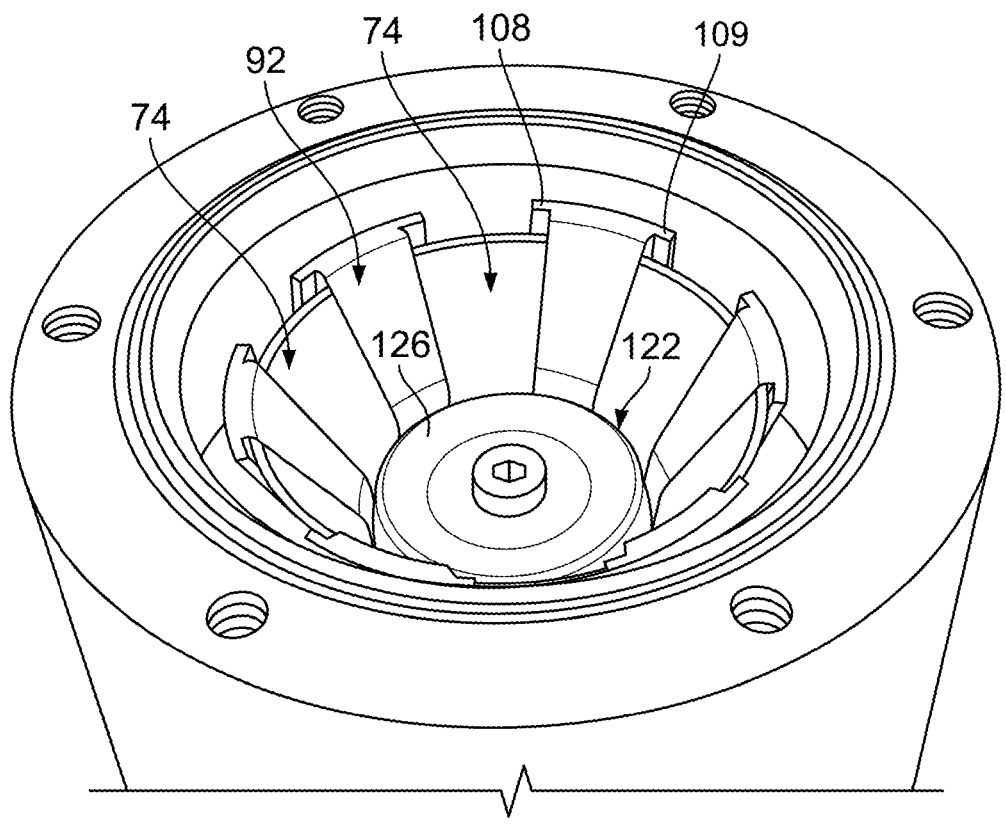
Figure 8:
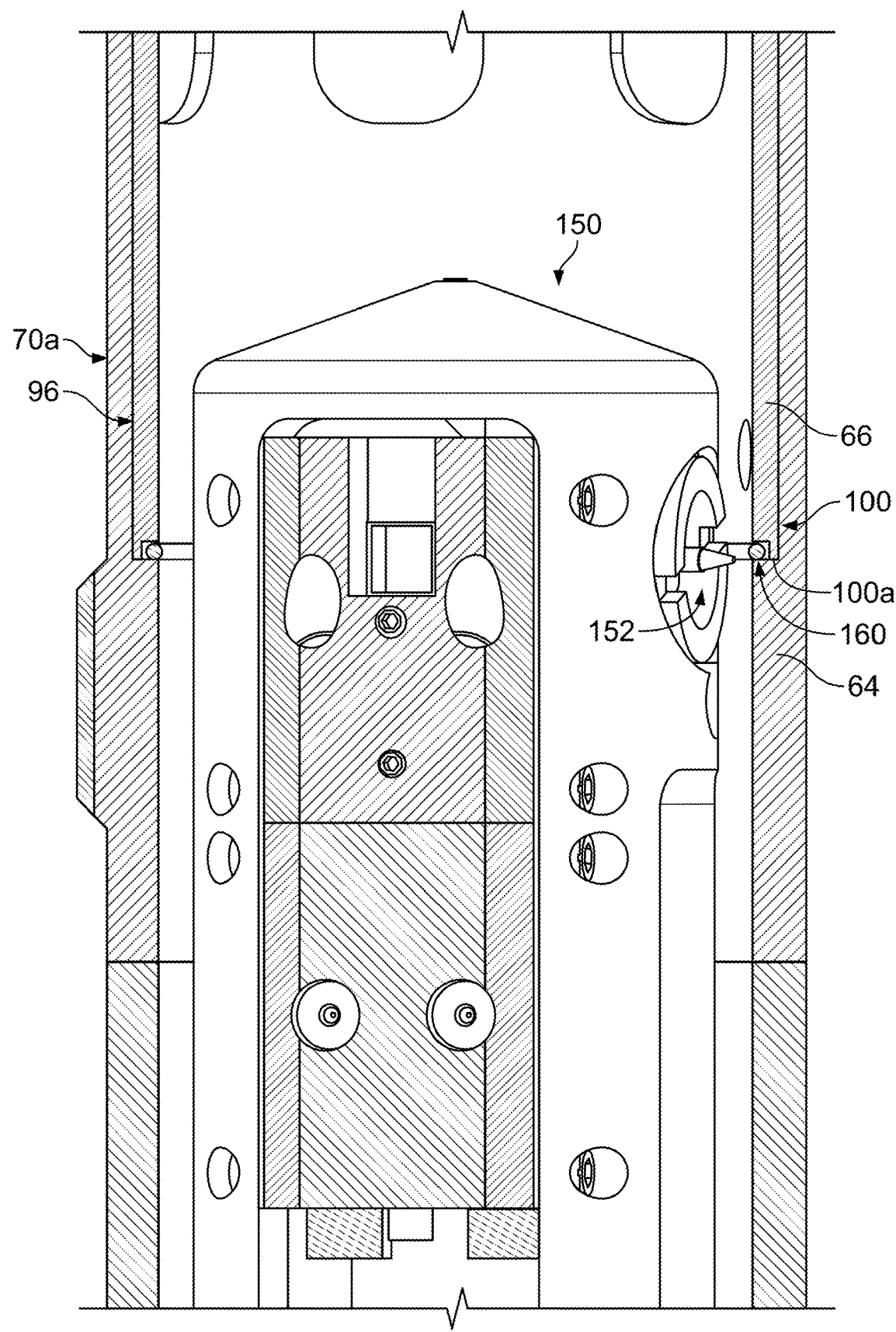
FIG. 8 shows a perspective view of a welding tool used in accordance with an embodiment of the present invention

During the radial expansion of upper ends 65, 67 of sleeves 64, 66 and the axial aligning of protrusions 106 with protrusions 84 in slots 76, wings 108, 109 are aligned in stepped sections 84h in outer circumferential surfaces 84a of protrusions 84. The alignment of wings 108, 109 in stepped sections 84h helps to lock sleeves 64, 66 in place with respect to each other. In this installed orientation, as shown in FIG. 6e, where segments 74, 92 are intermeshed with each other, cylindrical base section 96 of second sleeve 66 is arranged inside of and coaxial with top portion 70a of cylindrical base section 70 of first sleeve 64, as shown in FIG. 8.

After the radial expansion of upper ends 65, 67 of sleeves 64, 66 and the axial aligning of protrusions 106 with protrusions 84 in slots 76, lower surfaces 84c of protrusions 84 and lower surfaces 106c of protrusions 106 are in contact with support surface 44a to retain first sleeve 64 axially in place in nozzle 24. Lower surfaces 84c of protrusions 84 and lower surfaces 106c of protrusions 106 axially abut support surface 44a such that sleeves 64, 66 cannot be pulled downward when upper ends 65, 67 of sleeves 64, 66 are in the radially expanded configuration. Once upper ends 65, 67 are radially expanded such that protrusions 84 are in slots 94 and protrusions 106 are in slots 76, intermeshing segments 74 with segments 92, protrusions 84, 106 cannot be contracted radially inward into the radially contracted configuration via contact between edges 84f, 84g and edges 106f, 106g, and upper end 60 of sleeve assembly 62 is locked in the upper end 28 of nozzle 24. Sleeves 64, 66 may then be further joined together for example by welding. In particular, sleeves 64, 66 may be joined together using the welding tool 150 shown in FIG. 8. Welding tool 150 is configured for being received inside of sleeves 64, 66 and includes a weld head 152 configured for heating sleeves 64, 66 to weld sleeves 64, 66 together. In one preferred embodiment, as shown in FIG. 8, sleeve 64 includes an annular shoulder 160 at the inner circumference thereof that is configured for axially abutting a bottom edge 100a of lower end 100 of second sleeve 66, and weld tool 150 can weld sleeves 64, 66 together by heating bottom edge 100a and annular shoulder 160 via weld head 152 to join bottom edge 100a and annular shoulder 160 to each other.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A control rod drive mechanism thermal sleeve assembly for insertion into a control rod drive mechanism nozzle of a nuclear reactor pressure vessel, the control rod drive mechanism thermal sleeve assembly comprising:
a first sleeve including:
a radially variable end configured for being deformed between a radially contracted configuration and a radially expanded configuration, the radially variable end configured for retaining the sleeve in the control rod drive mechanism nozzle in the radially expanded configuration; and
a further end opposite of the radially variable end, the further end including a funnel having a frustoconical portion having a maximum diameter edge defining an end edge of the further end; and
a second sleeve configured for being deformed between an installation configuration and a retention configuration,
wherein in the retention configuration, the second sleeve is configured for retaining the first sleeve in the radially expanded configuration,
wherein in the installation configuration, the second sleeve is configured for insertion into the first sleeve,
wherein when the second sleeve retains the first sleeve in the radially expanded configuration, the first sleeve and the second sleeve are intermeshed.

2. The control rod drive mechanism thermal sleeve assembly as recited in claim 1 wherein the second sleeve includes a radially variable end configured for being deformed between a radially contracted configuration and a radially expanded configuration, the radially variable end of the second sleeve being in the radially contracted configuration in the installation configuration and being in the radially expanded configuration in the retention configuration.

3. The control rod drive mechanism thermal sleeve assembly as recited in claim 2 wherein the radially variable end of the first sleeve includes a plurality of first segments circumferentially spaced from each other by first slots and the radially variable end of the second sleeve includes a plurality of second segments circumferentially spaced from each other by second slots, the first segments and the second segments being flexible radially inward and radially outward.

4. The control rod drive mechanism thermal sleeve assembly as recited in claim 3 wherein the first segments and the second segments are configured for being intermeshed in the retention configuration of the second sleeve.

5. The control rod drive mechanism thermal sleeve assembly as recited in claim 4 wherein each of the circumferentially spaced first segments includes a radially outwardly extending first protrusion and each of the circumferentially spaced second segments includes a radially outwardly extending second protrusion, the first segments and the second segments being intermeshed by each of the first protrusions being received in one of the second slots and each of the second protrusions being received one of the first slots.

6. The control rod drive mechanism thermal sleeve assembly as recited in claim 3 wherein each of the second segments is provided with a projection extending radially outward from the second segment, each of the projections configured for being received in one of the first slots in the installation configuration and the retention configuration.

7. A method for replacing a damaged sleeve lining the control rod drive mechanism nozzle passing through a nuclear reactor pressure vessel, the damaged sleeve having an end including a radially enlarged end portion configured for resting on a support section of the control rod drive mechanism nozzle for retaining the damaged sleeve in the control rod drive mechanism nozzle, the method comprising:
removing the damaged sleeve from the control rod drive mechanism nozzle;
providing the control rod drive mechanism thermal sleeve assembly as recited in claim 1;
installing the control rod drive mechanism thermal sleeve assembly in the control rod drive mechanism nozzle such that the radially variable end of the first sleeve is received by the support section, the radially variable end being in the radially contracted configuration during installation and being in the radially expanded configuration after the control rod drive mechanism thermal sleeve assembly is installed in the control rod drive mechanism nozzle; and
deforming the second sleeve from the installation configuration to the retention configuration to retain the radially variable end of the first sleeve in the radially expanded configuration.

8. The method as recited in claim 7, wherein the installing of the control rod drive mechanism thermal sleeve assembly includes inserting the radially variable end of the first sleeve in the radially contracted configuration in a first end of the control rod drive mechanism nozzle, the radially variable end of the first sleeve being in the radially expanded configuration in a second end of the control rod drive mechanism nozzle after installation.

9. The method as recited in claim 8 wherein the first end of the control rod drive mechanism nozzle is a lower end of the control rod drive mechanism nozzle and the second end of the control rod drive mechanism nozzle is an upper end of the control rod drive mechanism nozzle.

10. The method as recited in claim 7, wherein the second sleeve is held in the radially variable end of the first sleeve during the installing of the control rod drive mechanism thermal sleeve assembly in the control rod drive mechanism nozzle.

11. The method as recited in claim 10 wherein the second sleeve includes a radially variable end configured for being deformed between a radially contracted configuration and a radially expanded configuration, the radially variable end of the second sleeve being in the radially contracted configuration in the installation configuration and being in the radially expanded configuration in the retention configuration.

12. The method as recited in claim 11 wherein the radially variable end of the first sleeve includes a plurality of first segments circumferentially spaced from each other by first slots and the radially variable end of the second sleeve includes a plurality of second segments circumferentially spaced from each other by second slots, the first segments and the second segments being flexible radially inward and radially outward.

13. The method as recited in claim 12 wherein the deforming of the second sleeve from the installation configuration to the retention configuration to retain the radially variable end of the first sleeve in the radially expanded configuration includes intermeshing the first segments and the second segments.

14. The method as recited in claim 13 wherein each of the circumferentially spaced first segments includes a radially outwardly extending first protrusion resting on the support section after the sleeve assembly is installed in the control rod drive mechanism nozzle and each of the circumferentially spaced second segments includes a radially outwardly extending second protrusion resting on the support section after the control rod drive mechanism thermal sleeve assembly is installed in the control rod drive mechanism nozzle.

15. The method as recited in claim 14 wherein the first protrusions are circumferentially spaced apart from each other by the first slots and the second protrusions are circumferentially spaced apart from each other by the second slots, the intermeshing the first segments and the second segments including aligning the first segments and the second segments such that each of the first protrusions is received in one of the second slots and each of the second protrusions is received one of the first slots.

16. The method as recited in claim 15 wherein the deforming of the second sleeve from the installation configuration to the retention configuration to retain the radially variable end of the first sleeve in the radially expanded configuration includes deforming the second segments to force the second protrusions radially outward from each other and pulling the second sleeve downward so each of the second protrusions is in one of the first slots and the first and second protrusions are in axial alignment with each other.

17. The method as recited in claim 12 wherein each of the second segments is provided with a projection extending radially outward from the second segment, each of the projections being received in one of the first slots during the installing of the control rod drive mechanism thermal sleeve assembly in the control rod drive mechanism nozzle and the deforming of the second sleeve from the installation configuration to the retention configuration.

18. The method as recited in claim 7 wherein the first sleeve includes a funnel at an end thereof that is opposite of the radially variable end, the funnel being part of the first sleeve during the installing of the control rod drive mechanism thermal sleeve assembly in the control rod drive mechanism nozzle.

19. The method as recited in claim 7 wherein the control rod drive mechanism nozzle passes through a closure head of the nuclear reactor pressure vessel, the closure head being separated from a cylindrical shell of the nuclear reactor pressure vessel during the installing of the control rod drive mechanism thermal sleeve assembly in the tube.

\* \* \* \* \*